No. 747,970. PATENTED DEC. 29, 1903.
R. HAWKINS.
SHEET METAL SEAM.
APPLICATION FILED MAY 25, 1903.
NO MODEL.
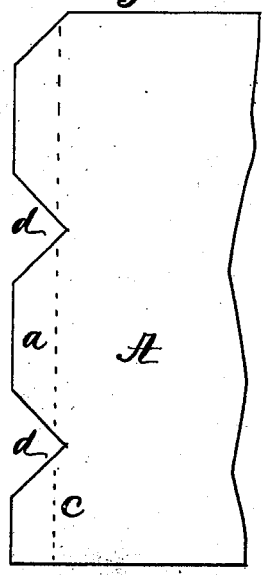
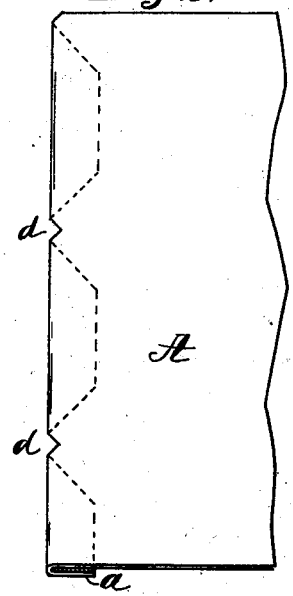
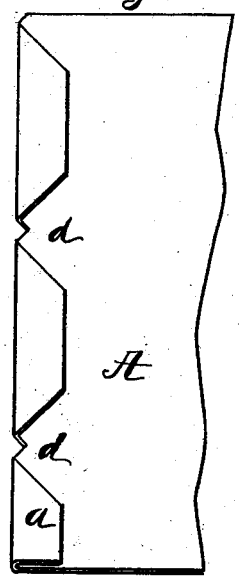
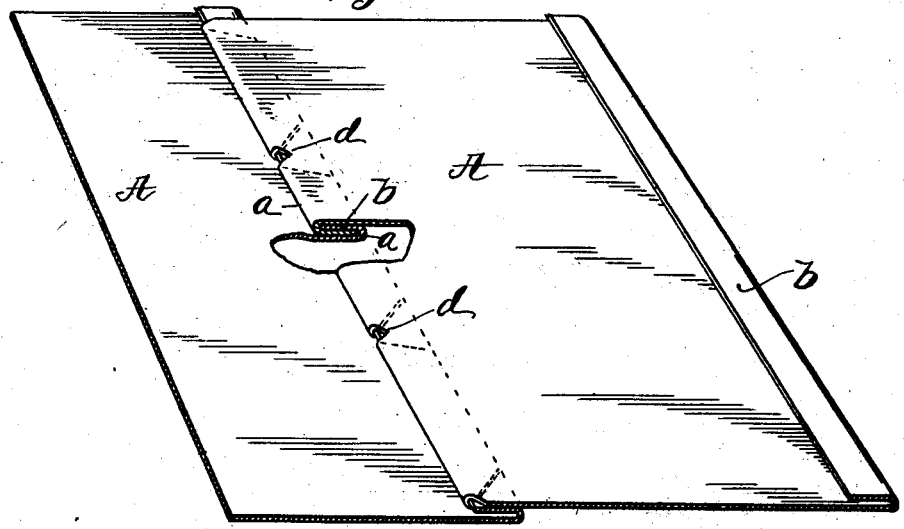
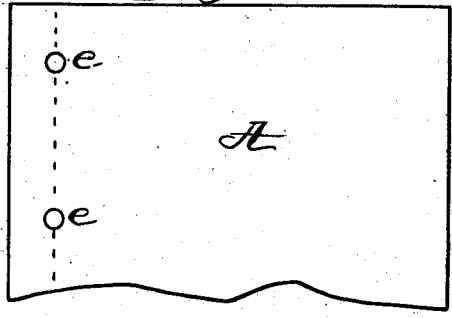
Witnesses,
S Mahlon Unger
John L. Pearsol
Inventor,
Rollyn Hawkins,
By Joseph A. Minturn.
Attorney.

No. 747,970.

Patented December 29, 1903.

UNITED STATES PATENT OFFICE.

ROLLYN HAWKINS, OF INDIANAPOLIS, INDIANA.

SHEET-METAL SEAM.

SPECIFICATION forming part of Letters Patent No. 747,970, dated December 29, 1903.

Application filed May 25, 1903. Serial No. 158,727. (No model.)

*To all whom it may concern:*

Be it known that I, ROLLYN HAWKINS, a citizen of the United States, residing at Indianapolis, in the county of Marion and State of Indiana, have invented certain new and useful Improvements in Sheet-Metal Seams, of which the following is a specification.

The object of this invention is to facilitate the soldering of the seams which unite the edges of metal sheets, wherein the edges of each sheet at the joints are folded over and the folded portions interlocked; and the invention has special reference to the joining together of metal sheets for roof-covers, gutters, valleys, flashings, and the like; but it is equally applicable to all other purposes for which metal joints having a compound fold are or may be used.

The difficulty heretofore has been to get the solder when introduced at one edge of the joint to permeate between all of the several laps, so as to thoroughly unite the parts of the seam and prevent their breaking by expansion and contraction and to prevent the accumulation of moisture in the seam or under the metal plates to destroy by freezing or rust. The efforts to solder the joint along both of its edges have resulted in attempting to solder the second edge in melting out the solder which had been applied to the first; and the prime object of my invention is to cause the solder when applied to one edge of a seam to permeate all of the folds of that joint.

I accomplish the objects of the invention by the mechanism illustrated in the accompanying drawings, in which—

Figure 1 is a detail in plan view of a blank used in carrying out my invention; Fig. 2, the same with the edge to be joined folded over; Fig. 3, a like view of the reverse side of the blank shown in Fig. 2; Fig. 4, a perspective view of two metal sheets joined by means of my improved seam, the sheets being broken away in part along the seam to more fully show the construction of the joint; and Fig. 5, a blank showing a modified form of perforation.

Like characters of reference indicate like parts throughout the several views of the drawings.

A A represent sheets of any kind of metal such as is suitable for the purposes for which the metal is to be used. The edges $a$ of the sheets will be folded over along the dotted line $c$ into parallel position with the body of the sheet; but before this is done the edge will be provided with the notches $d$, preferably angular in shape, as shown, which notches extend inwardly slightly past the line of the fold $c$. The folds $a$ and $b$ of the edges of two sheets to be joined will be hooked or fitted together in the manner shown in Fig. 4. The joints thus formed will be pressed together, and heated solder will then be applied in the usual manner along the notched edge, which is shown as the upper edge in Fig. 4. In a joint without the notches the solder will enter freely between the lower member or plate and the fold above. It will pass the first bend in the fold with difficulty, and at the second bend little or none of the solder will pass; but with the perforations formed by the notches $d$ the solder will enter at once and freely between all of the members of the seam, and the broad mouth of the notch, which opens toward the back of the seam when the parts are assembled, provides a conduit and pocket for the liberal flow and deposit of the solder.

While the notches above described are preferable, it is obvious that any shape of perforation placed at the line of the bend will be operative—such, for example, as the circular perforations $e$, (shown in the modification at Fig. 5)—and I therefore do not desire to limit my invention to the form shown or to a perforation of any particular shape or size or to any certain number within a given distance.

It is not desired to limit the invention to a joint having the number of folds shown in the drawings and above described, as it is applicable to joints having many or few folds.

Having thus fully described my invention, what I claim as new, and wish to secure by Letters Patent, is—

1. A folded seam for metallic sheets having openings at the bend of a fold for the passage of solder therethrough.

2. A seam for metallic sheets, formed by folding the edges of two portions of metal and interlocking the folded portions, the sheets at the bends of said folds being provided with perforations through which solder is introduced between all members of the folds.

3. A seam for metallic sheets, formed by folding the edges of two portions of metal and interlocking the folded portions, the sheets having indents extending from an edge to a point inside of the line of the fold for the introduction of solder between all members of the folds.

In witness whereof I have hereunto set my hand and seal, at Indianapolis, Indiana, this 21st day of May, A. D. 1903.

ROLLYN HAWKINS. [L. S.]

Witnesses:
S. MAHLON UNGER,
JOHN B. SHERWOOD.